United States Patent [19]
Andersen

[11] 3,763,745
[45] Oct. 9, 1973

[54] CLOSED CENTER VALVE CONTROL SYSTEM

[75] Inventor: Joseph J. Andersen, Bristol, Conn.

[73] Assignee: Chandler Evans Inc., West Hartford, Conn.

[22] Filed: Jan. 28, 1972

[21] Appl. No.: 221,652

[52] U.S. Cl.............. 91/186, 91/363 R, 91/446
[51] Int. Cl......... F01b 1/00, F15b 9/03, F15b 9/09
[58] Field of Search.............. 91/186, 47, 363 R, 91/361, 446

[56] References Cited
UNITED STATES PATENTS

| | | |
|---|---|---|
| 3,266,378 | 8/1966 | Shaw .................................. 91/363 R |
| 3,521,535 | 7/1970 | Oelrich .............................. 91/186 |
| 3,561,326 | 2/1971 | Cassaday .......................... 91/363 R |
| 3,664,234 | 5/1972 | Simons .............................. 91/363 R |

Primary Examiner—Paul E. Maslousky
Attorney—David S. Fishman et al.

[57] ABSTRACT

An actuator system wherein on-off solenoid operated valves of piston type actuators are controlled so as to establish a dead band. The control valves are energized by time variable width pulses generated by modulator means responsive to input position information and threshold bias signals which determine the dead band.

13 Claims, 8 Drawing Figures

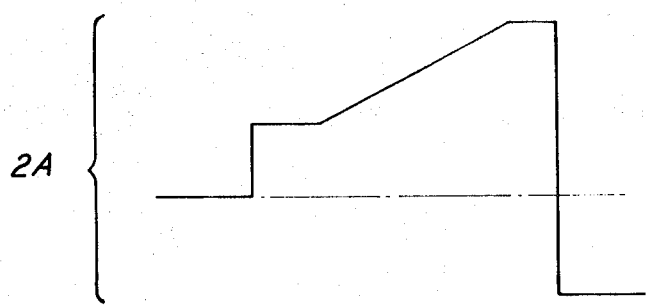
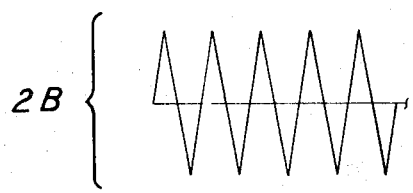
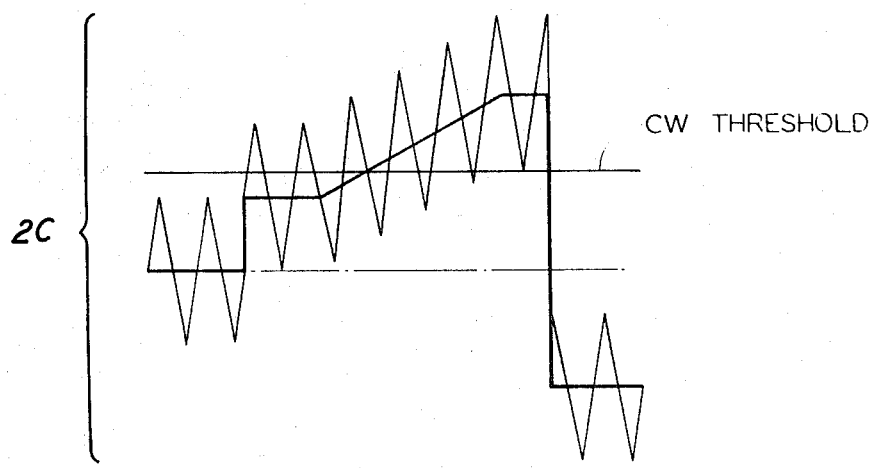
CW THRESHOLD
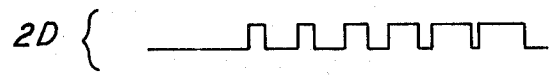
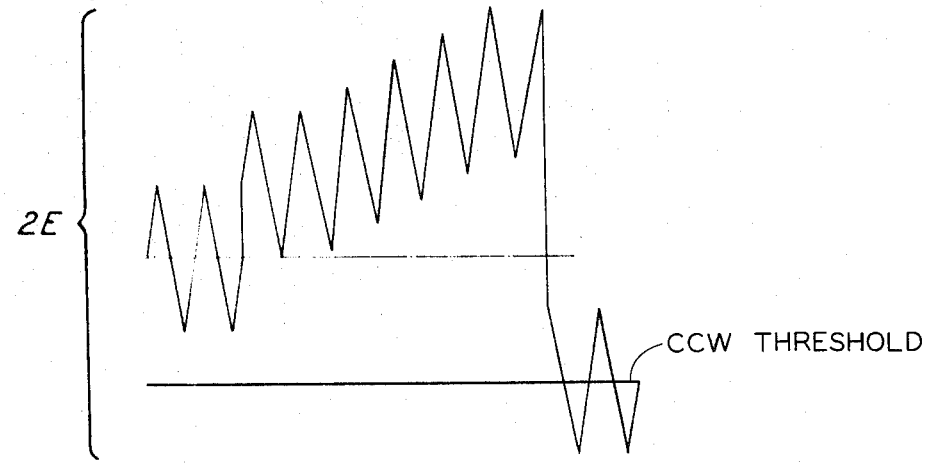
CCW THRESHOLD

CLOSED CENTER VALVE CONTROL SYSTEM

BACKGROUND OF THE INVENTION

1. Field of the Invention

The present invention relates to the positioning of movable members. More specifically, the present invention is directed to fluidic actuators and load position control systems including such actuators. Accordingly, the general objects of the present invention are to provide novel and improved methods and apparatus of such character.

2. Description of the Prior Art

While not limited thereto in its utility, the actuator system of the present invention is particularly well suited for use in environments wherein very severe reliability, weight and space requirements are imposed on the means for positioning movable members. Thus, by way of example and for purposes of explanation only, the invention may be considered in the environment of a steering fin actuator for a missile.

Position control systems employing fluidic actuators, including those which utilize a self-contained pressurized gas source to supply power for moving a load, are well known in the art. Those prior art control systems which are of the time modulated type have been found to be particularly well suited for use in quasi-continuous open and also in closed loop controls where operating fluid consumption as well as weight and space limitations are severe. Time modulated pneumatic actuator systems are disclosed in U.S. Pat. Nos. 3,430,536, 3,516,331, and 3,521,535; all of said patents being assigned to the assignee of the present invention and being incorporated herein by reference.

SUMMARY OF THE INVENTION

The present invention constitutes an advancement over the actuator systems of the prior art in that it comprises a closed center valve control system with improved power fluid consumption characteristics. The actuator system of the present invention also offers improvements in stability, particularly when compared to prior art differential area piston devices, due to its symmetry of operation. In a preferred embodiment, the present invention may be considered a time modulated, closed center valve control system wherein on/off solenoid operated ball poppet valves are utilized to position associated and interconnected piston type actuators. The solenoids of the valves are energized by signals generated by control electronics which provides time variable width pulses. These pulses are delivered to the solenoids in such a manner as to selectively control flow to the appropriate actuator to thereby control the differential pressure across the actuator system.

In accordance with a particularly novel feature of the present invention the mechanical output of the actuator system is derived from a pair of actuator pistons in such a manner that clockwise or counterclockwise directed torque may be produced. The pistons of the actuators are disposed in respective cylinders and are mechanically interconnected via a rotatable output mechanism. A solenoid operated ball poppet valve is associated with each actuator and, under the command of time modulated energization signals provided by the control electronics, the valves control the pressure as measured at the first sides of the two pistons; i.e., the differential pressure across the actuator system. Control pressure from a source is normally applied to the first faces of both pistons. In response to the energization signals one of the valves will be momentarily opened thereby venting the associated cylinder and permitting the source pressure acting on the first face of the piston in the other cylinder to push the actuator system output mechanism in the appropriate direction.

In accordance with a further novel feature of the invention threshold control signals may be applied to the control electronics in the interest of providing a dead zone in the valve operating characteristic. The existence and magnitude of the dead zone will determine the degree of closed centerness of the control valves. In steady-state operation the coexistence of a dead zone which encompasses the region in which each valve would otherwise operate will result in a closed valve condition with virtually zero leakage flow.

In accordance with a further feature of the present invention steady-state leakage flow may be totally eliminated by incorporation of a power source shut-off valve between the source and actuators. Use of the pressure shut-off valve permits gas pressure to be entrapped in the cylinders of the actuators whereby steady-state torque may be maintained with zero leakage flow.

BRIEF DESCRIPTION OF THE DRAWING

The present invention may be better understood and its numerous objects and advantages will become apparent to those skilled in the art by reference to the accompanying drawing in which:

FIGS. 2A through 2F depict the waveforms of signals which appear at various points in the electronic control circuitry of the present invention.

DESCRIPTION OF PREFERRED EMBODIMENT

Figure 1:
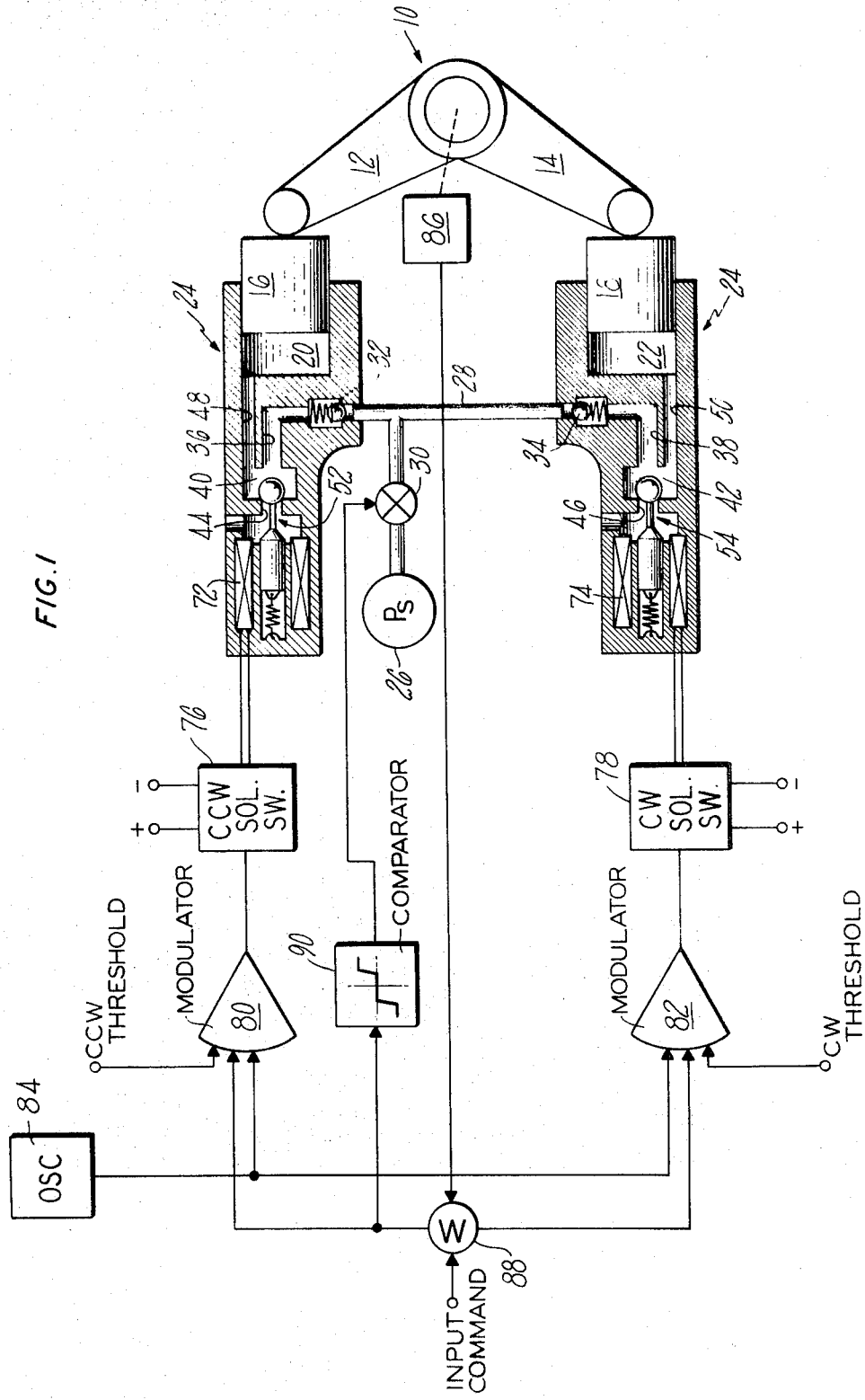
FIG. 1 is a schematic representation of a first embodiment of the present invention.

With reference now to FIG. 1, an actuator system having an output member 10 capable of clockwise and counterclockwise motion is depicted schematically. Output member 10 will typically be coupled, by a drive shaft or other mechanical linkage means not shown, to a load such as a missle steering fin. The arms 12 and 14 of actuator 10 are respectively mechanically coupled to pistons 16 and 18. Pistons 16 and 18 are positioned in respective cylinders 20 and 22 of a pair of pneumatic actuators. It is to be noted that the two actuators have been shown separately in FIG. 1 in the interest of facilitating understanding of the invention. In actual practice, however, both of cylinders 20 and 22 will be formed within the same housing; the housing for the pneumatic subsystem of the actuator system of the invention being indicated generally at 24.

The housing 24 is provided with internal passages by which fluid communication is established between a source of pressurized fluid, typically gas, and cylinders 20 and 22 at first sides of pistons 16 and 18. In the disclosed embodiment the pressurized source includes a bottle or tank 26 and a T-conduit 28 which extends between tank 26 and appropriate inlets in housing 24. It is to be observed that the base leg of T-conduit 28 includes a shut-off valve 30 which is optional equipment. The purpose of valve 30 will be described in detail below. It is also to be noted that tank 26 will typically include a pressure regulator whereby the pressure applied to each of cylinders 20 and 22 will remain constant throughout the useful operating life of a self-contained source.

Immediately downstream of each of the discharge ends of T-conduit 28 the housing 24 is provided with a valve chamber. Check valves 32 and 34 are installed in these chambers and prevent the flow of gas from respective of cylinders 20 and 22 back toward the source 26; both check valves being shown in the abnormal closed position. The chambers including valves 32 and 34 are respectively connected to further valve chambers in housing 24 via passages 36 and 38. These further valve chambers, indicated respectively at 40 and 42, are provided with oppositely disposed seats; first seats being formed at the inlets from passages 36 and 38 and second seats being formed at the entrance to vent ports 44 and 46. Continuous communication between chambers 40 and 42 and their associated cylinders 20 and 22 is provided respectively by passages 48 and 50.

The balls of respective of a pair of solenoid operated ball poppet valves, indicated generally at 52 and 54, are positioned within chambers 40 and 42 and in cooperating relationship with the opposed inlet and vent ports to the chamber. Valves 52 and 54 may be of the type clearly shown in FIG. 4 of referenced U.S. Pat. No. 3,521,535. The balls of valves 52 and 54 close respective vent passages 44 and 46 with the actuators in their quiescent condition as shown. Actuation of the valves between the positions shown and sealing relationship to the seat formed at the inlet ends of respective passages 36 and 38 is achieved by magnetically actuated guide-plunger assemblies. The magnetic fields for operating valves 52 and 54 are generated by the application of control signals to respective solenoids 72 and 74.

The control electronics for the embodiment of FIG. 1 comprises means for generating time modulated energization signals for solenoids 72 and 74. These energization signals are employed to control respective switches 76 and 78 which in turn control the application of direct current from a source, not shown, to the solenoids. The time modulated signals are generated by modulators 80 and 82. Modulator 82 is the clockwise modulator and generating energization signals for valve 54 in order to position piston 18. Modulator 80 is the counterclockwise control signal source and provides energization signals which ultimately control the operation of valve 52 in the interest of moving piston 16. In the preferred embodiment three input signals are applied to each of modulators 80 and 82. The first input signal is the time varying carrier voltage generated by oscillator 84. A preferred linear output waveform which may be provided by oscillator 84 is depicted in FIG. 2B. In addition to the carrier signal, each of modulators 80 and 82 have, in the disclosed closed loop embodiment, a position error signal, as represented by FIG. 2A, applied thereto. The position error signal will be a d.c. voltage level commensurate with any deviation between the actual position of the load connected to output member 10 and the desired load position. Modulator 80 has, in addition, a counterclockwise threshold signal, in the form of a d.c. bias, applied thereto. Modulator 82 additionally has a clockwise threshold bias applied thereto. The counterclockwise and clockwise threshold bias signals are respectively indicated in FIGS. 2C and 2E with appropriate labeling.

In a closed loop application position transducer means 86 is mechanically coupled to actuator 10. Transducer 86 may, for example, be one or a pair of potentiometers having their wiper arms mechanically coupled to member 10 for movement therewith. The signal appearing on the wiper arm or arms of the transducer means 86 will be compared with an input command signal in a summing circuit 88 to generate the position error signal applied to modulators 80 and 82.

Modulators 80 and 82 will typically comprise high gain operational amplifiers which operate as switches in the manner well known in the art.

From consideration of FIG. 2 it may be seen that the position error signal, waveform 2A, is summed with the carrier and in effect causes the carrier to be shifted. The shifted carrier signals are depicted in FIGS. 2C and 2E and the corresponding modulator output pulse trains are depicted in FIGS. 2D and 2F. It may be seen that, when the shifted carrier exceeds the threshold bias, switch energization pulses will be generated; the pulses having a width commensurate with the time during each cycle of the carrier that the carrier exceeds the threshold level. These time variable energization pulses control the operation of valves 52 and 54. Thus, to summarize, the carrier oscillator 84 generates a time varying signal which is applied to the input of each of pulse producer modulators 80 and 82. The amplitude of the carrier signal waveform is such that it alone will not switch either of the modulators from its normally off command condition. The application of an input command or position error signal will cause the carrier waveform to be shifted whereby its amplitude would normally be sufficient to cause the modulators to begin producing output pulses. A dead zone of no pulse generation is, however, created by the application of threshold bias signals to the modulators. By introducing a command signal of sufficient magnitude; i.e., greater than the established dead zone; a time variable width switching or energization pulse will be generated. Through the use of a triangular waveform carrier, although other waveforms are possible, a linear variation in the modulator output pulse width with error or command signal magnitude is obtained.

The power level of the time variable command pulses from modulators 80 and 82 are amplitude modulated by the solenoid switches 76 and 78 in order to drive the solenoid operated ball valves. The function of each of the solenoid operated ball valves, acting in response to time variable command pulses generated by the modulators, is to normally reside in a quiescent or inactive state while the time variable width pulses are "within" the dead zone. In this condition, the ball poppets of each valve will be held, by full actuator chamber pressure, on the discharge seat to prevent direct flow from the actuator chambers through vent ports 44 and 46. At this time the reverse flow check valves 32 and 34 will prevent flow from the actuator chambers back to the supply. Accordingly, with the valves 52 and 54 in the quiescent state, the working gas will be entrapped in the actuator chambers thereby developing maximum stiffness to disturbing loads applied to the actuator system. In addition, essentially all leakage from the chambers 20 and 22 is eliminated and minimal pneumatic power is wasted from the source.

The operating function of the solenoid operated ball valves, for active command wherein the modulated carrier is at least partly outside of the dead zone, is to develop a time modulated output. In the time modulated output mode the valve operation converts the pneumatic supply pressure into a substantially steady-state force which acts on output member 10 to displace a compliant load. Thus, in response to a command which "exceeds" the threshold bias, one of valves 52 or 54 will be periodically opened in accordance with a pulse width modulated control signal and pressure will be vented from the one of cylinders 20 and 22 associated with the operated valve while source pressure will be maintained in the other cylinder thereby resulting in pushing of the piston in said other cylinder and rotational motion of member 10. It will be understood that, if the load on the actuator is a force or torque, one of the valves will be continuously pulsed until the command "falls" within the dead zone.

Figure 3:
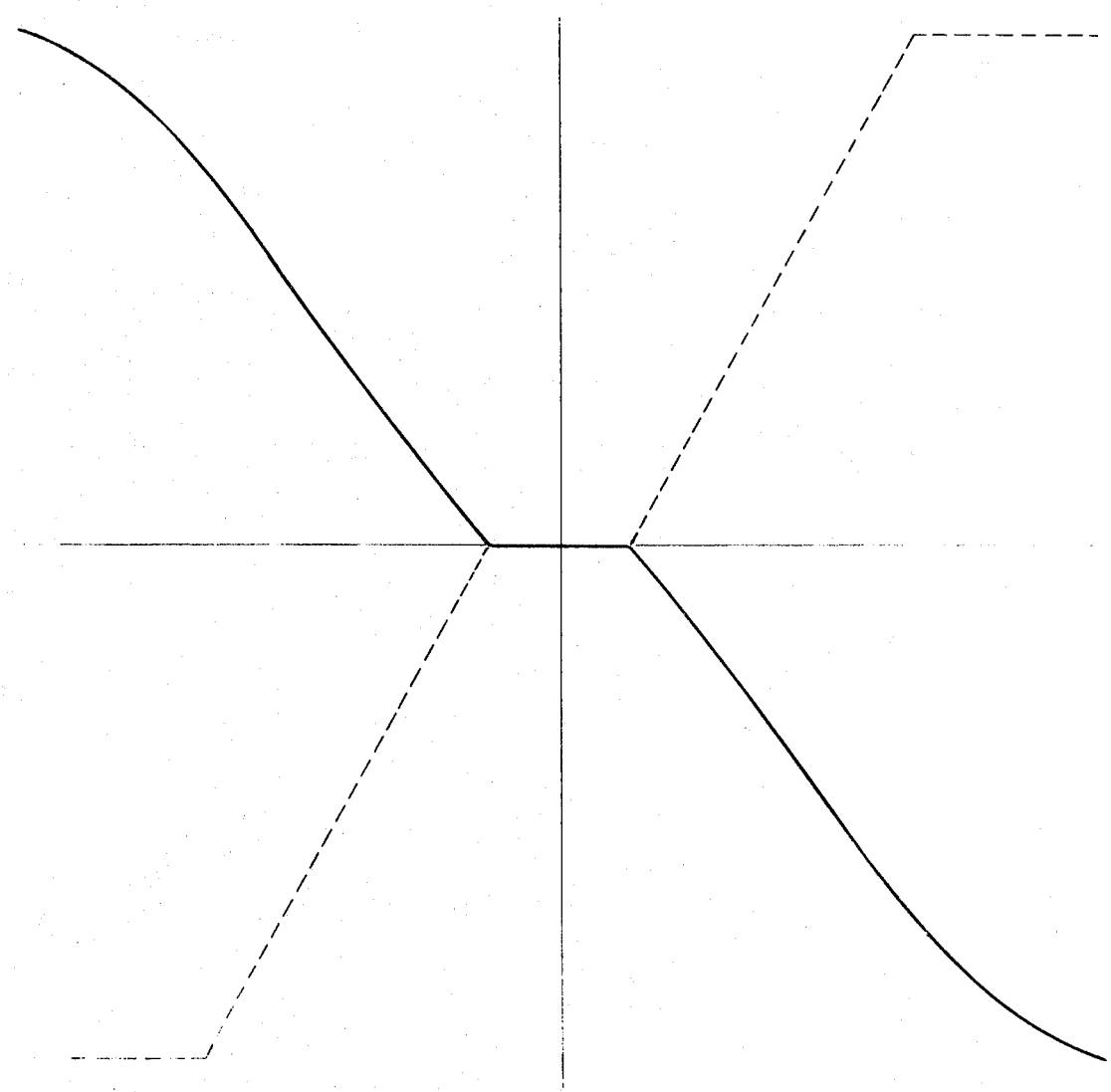
FIG. 3 is a plot of the functional relationship between slewing rate flow and input error signal magnitude and also of the functional relationship between the differential pressure developed across the actuator system of the FIG. 1 embodiment and input error signal magnitude.

Operation of the present invention may be further understood by reference to FIG. 3. In this figure a plot of differential load pressure applied to the actuator for an input command signal of varying magnitude is depicted as a solid line. The dominant feature shown in FIG. 3 is the dead zone that has been created in the pressure characteristics by application of the threshold bias signals. The broken line in FIG. 3 is a plot of the slewing rate flow characteristics of the actuator vrs signal command. In steady-state operation the coexistence of both of these operating dead zones will result in a closed valve condition with nearly zero leakage flow.

Leakage may be further reduced, and in fact virtually eliminated, for all conditions of differential pressure or developed torque through the use of the power source shut-off valve 30. Valve 30 may, for example, be a two-way solenoid controlled valve similar to valves 52 and 54. Valve 30 may be operated to close off communication between source 26 and the actuators and to vent the actuator supply conduit 28 whereby existing gas pressures will be entrapped, by the closed control valves 52 and 54 and the reverse flow check valves 32 and 34, in the actuator cylinders to maintain steady-state torque with zero leakage flow. Valve 30 may be controlled by the position error signal via a comparator circuit 90. Circuit 90 will establish a dead zone commensurate with that imposed on modulators 80 and 82.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A fluid driven actuator system comprising:
   first piston means, said first piston means including a first drive piston disposed for motion in a cylinder;
   means coupling a first side of said first drive piston to a movable load;
   means for supplying pressurized fluid to said first piston means cylinder at the second side of said first drive piston;
   means for venting fluid from said first piston means cylinder at said second side of said first drive piston;
   a first normally deenergized and closed solenoid operated control valve for sealing said venting means, said first solenoid operated control valve opening said venting means to reduce the pressure in said first piston means cylinder when in the energized condition to thereby permit movement of said first drive piston in a first direction;
   modulator means responsive to a time varying signal having a mean value which is a function of load position error and to a threshold bias signal for generating a pulse width modulated valve control energization signal whenever said time varying signal exceeds said threshold bias signal whereby a dead zone for said piston means is created; and
   means for coupling valve control energization signals generated by said modulator means to the solenoid of said first control valve.

2. The apparatus of claim 1 wherein said means for supplying pressurized fluid comprises:
   a pressurized fluid source; and
   check valve means interposed between said fluid source and said first piston means cylinder to prevent reverse flow from said cylinder to said source, said check valve means cooperating with said first control valve to entrap operating fluid in said first piston means cylinder with said control valve in the normally closed condition.

3. The apparatus of claim 2 further comprising:
   shut-off valve means for disrupting communication between the pressurized fluid source and said check valve means whereby fluid may be entrapped in said piston means cylinder with the piston in any position.

4. A fluid driven actuator system comprising:
   first piston means, said first piston means including a first drive piston disposed for motion in a cylinder;
   means coupling a first side of said first drive piston to a movable load;
   second piston means, said second piston means including a second drive piston disposed for motion in a cylinder;
   means coupling a first side of said second drive piston to the movable load;
   means for supplying pressurized fluid to said first and second piston means cylinders at the second sides of said drive pistons;
   first control valve means for adjusting the pressure in said first piston means cylinder at the second side of said first drive piston to vary the position of said first drive piston;
   second control valve means for adjusting the pressure in said second piston means cylinder at said second side of said second drive piston to vary the position of said second drive piston;
   means for operating said first control valve means in response to valve control energization signals;
   means for operating said second control valve means in response to valve control energization signals;
   oscillator means for generating a time varying carrier signal;
   modulator means responsive to said time varying signal provided by said oscillator means and to signals commensurate with position errors of the movable load for generating a time varying signal having a mean value which is a function of load position error, said modulator means being further responsive to clockwise and counterclockwise threshold bias signals, said modulator means generating pulse width modulated valve control energization signals whenever said generated time varying signal exceeds one of said threshold bias signals whereby a dead zone for said piston means is created;

means for coupling valve control energization signals generated by said modulator means and commensurate with position errors in a first direction to said first control valve operating means; and means for coupling valve control energization signals generated by said modulator means and commensurate with position errors in a second direction to said second control valve operating means.

5. The apparatus of claim 4 wherein said modulator means comprises:

means responsive to signals commensurate with the actual and desired positions of the load for generating first and second error signals respectively commensurate with clockwise and counterclockwise position errors;

first amplifier means connected to said oscillator means and said position error signal generating means and responsive to a signal commensurate with a clockwise position error and to said time varying carrier signal, said first amplifier means further being responsive to a clockwise threshold bias signal and generating a pulse width modulated valve energization signal for application to said first control valve means whenever the sum of said clockwise position error and time varying signals exceeds said clockwise threshold bias signal; and second amplifier means connected to said oscillator means and said position error signal generating means and responsive to a signal commensurate with counterclockwise load position error and to said time varying carrier signal, said second amplifier means further being responsive to a counterclockwise threshold bias signal and generating a pulse width modulated valve energization signal for application to said second control valve means whenever the sum of said counterclockwise position error and time varying signals exceeds said counterclockwise bias signal.

6. The apparatus of claim 4 wherein said control valve means each comprises:

means for venting fluid from the associated piston means cylinder; and normally closed and deenergized solenoid operated valve means cooperating with said venting means to prevent escape of pressurized fluid from the associated piston means cylinder in the closed condition, energization of said valve means opening said venting means whereby a reduction in the associated cylinder pressure results.

7. the apparatus of claim 6 wherein said pressurized fluid supplying means comprises:

a pressurized fluid source;

conduit means for coupling said source to said first piston means cylinder, said conduit means including first check valve means for preventing reverse flow of fluid from said first piston means cylinder toward the source, said first check valve means cooperating with said first control valve means for entrapping operating fluid in said first piston means cylinder when said first control valve means is in the closed position; and second conduit means for coupling said source to said second piston means cylinder, said second conduit means including second check valve means for preventing reverse flow of fluid from said second piston means cylinder toward the source, said second check valve means cooperating with said second control valve means for entrapping operating fluid in said second means cylinder when said second control valve means is in the closed position.

8. The apparatus of claim 7 wherein said modulator means comprises:

means responsive to signals commensurate with the actual and desired positions of the load for generating first and second error signals respectively commensurate with clockwise and counterclockwise position errors;

first amplifier means connected to said oscillator means and said position error signal generating means and responsive to a signal commensurate with a clockwise position error and to said time varying carrier signal, said first amplifier means further being responsive to a clockwise threshold bias signal and generating a pulse width modulated valve energization signal for application to said first control valve means whenever the sum of said clockwise position error and time varying signals exceeds said clockwise threshold bias signal; and second amplifier means connected to said oscillator means and said position error signal generating means and responsive to a signal commensurate with counterclockwise load position error and to said time varying carrier signal, said second amplifier means further being responsive to a counterclockwise threshold bias signal and generating a pulse width modulated valve energization signal for application to said second control valve means whenever the sum of said counterclockwise position error and time varying signals exceeds said counterclockwise bias signal.

9. The apparatus of claim 8 further comprising:

shut-off valve means for disrupting communication between said source and said check valve means and for venting said conduit means whereby fluid may be entrapped in said piston means cylinders with the piston in any position.

10. The apparatus of claim 9 wherein said shut-off valve means comprises:

a solenoid controlled valve; and means responsive to a signal commensurate with load position error for generating control signals for said shut-off valve means solenoid controlled valve, said signal generating means establishing a dead band commensurate with the dead zone created by said modulating means.

11. The apparatus of claim 7 further comprising:

shut-off valve means for disrupting communication between said source and said check valve means and for venting said conduit means whereby fluid may be entrapped in said piston means cylinders with the piston in any position.

12. The apparatus of claim 11 wherein said shut-off valve means comprises:

a solenoid controlled valve; and means responsive to a signal commensurate with load position error for generating control signals for said shut-off valve means solenoid controlled valve, said signal generating means establishing a dead band commensurate with the dead zone created by said modulating means.

13. The apparatus of claim 3 wherein said shut-off valve means comprises:
a solenoid controlled valve; and
means responsive to a signal commensurate with load position error for generating control signals for said shut-off valve means solenoid controlled valve, said signal generating means establishing a dead band commensurate with the dead zone created by said modulating means.

* * * * *